(No Model.)

G. W. DE WITT.
GANG PLOW.

No. 587,521.                             Patented Aug. 3, 1897.

Witnesses,

Inventor,
George W. de Witt
By Dewey & Co.
Atty.

UNITED STATES PATENT OFFICE.

GEORGE W. DE WITT, OF SAN ARDO, CALIFORNIA.

GANG-PLOW.

SPECIFICATION forming part of Letters Patent No. 587,521, dated August 3, 1897.

Application filed March 26, 1897. Serial No. 629,340. (No model.)

*To all whom it may concern:*

Be it known that I, GEORGE W. DE WITT, a citizen of the United States, residing at San Ardo, county of Monterey, State of California, have invented an Improvement in Gang-Plows; and I hereby declare the following to be a full, clear, and exact description of the same.

My invention relates to devices for adjusting and guiding gang-plows of that class in which the plows are supported from a triangular framework having wheels near the angles and means for attaching the team to the base of the triangular frame.

My invention consists in certain details of construction, which will be more fully explained by reference to the accompanying drawings, in which—

Figure 1:
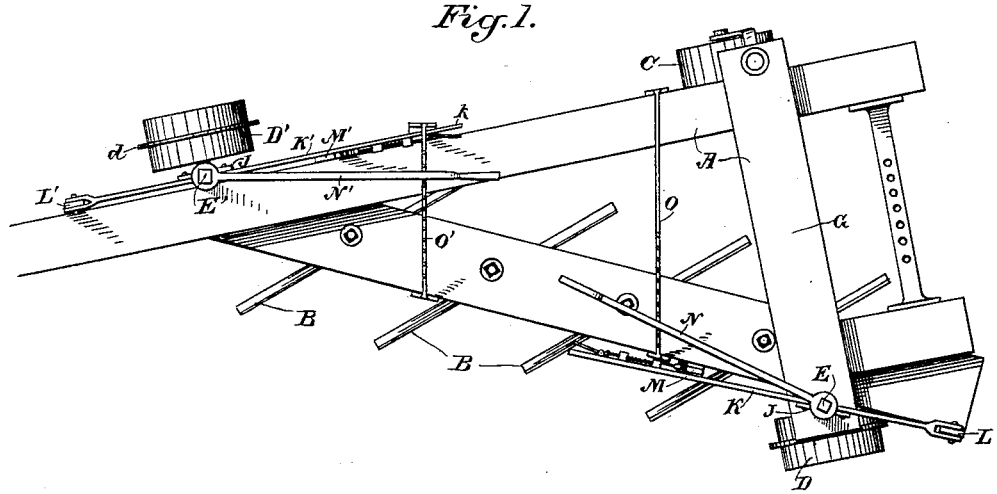
Figure 2:
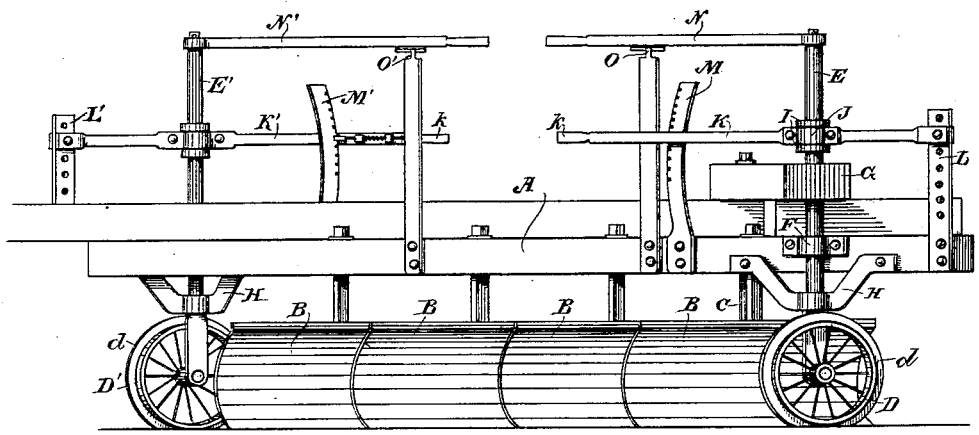

Figure 1 is a plan view of my device. Fig. 2 is a side elevation.

In the operation of gang-plows of this class the furrow-wheel and the rear land-wheel are usually journaled to travel rigidly in line and incapable of motion to right or left. In my invention I so arrange these wheels and the connected standards that one or both of them may be held rigidly to resist side thrust, or by turning them to an angle with the line of travel they will act to throw the planes to or from the land, and thus regulate the cut. These wheels are provided with radial flanges, so as to provide a better hold on the ground.

A is the frame of a gang-plow, made triangular in shape, as shown, and of any suitable material, either of wood or iron.

B B are the plows, which are suitably fixed to the frame and disposed with relation to each other in gangs of four or more, according to the size of the plow. One of the bases of the triangle serves as the front of the plow and has connected with it any suitable means for attaching the team by which the plow is drawn. Upon one of the beams of the triangle and near the front end thereof is mounted a swivel-wheel C, which runs upon the unplowed land and is allowed to turn in any direction, so as to make it easy for the plow to be turned around when the end of the furrow is reached. The landsides of the plow lie in the direction adjacent to this side of the frame. Upon the opposite side of the front of the plow is a wheel D, and upon the rear of the plow is a wheel D'. These wheels are essentially supported and operated in the same manner. Therefore the description of the front wheel D will apply to the construction and operation of both wheels.

The wheel D is journaled in a rigid supporting-standard E, which passes through a box F upon the side of the beam A, thence through the cross-beam G, and up to a convenient height above the frame, for the desired purposes to be hereinafter described.

From the lower part of the beam A a yoke H is shown, having a central journal through which the lower part of the shaft E passes and by which it is additionally steadied close to the wheel, so as to resist the side thrust which may be brought upon the latter. This wheel is provided with a projecting flange $d$, which is formed of a narrow band of iron shrunk upon the center of the wheel, thus forming a projecting tongue, which enters the hard ground in the furrow and serves to steady and hold the wheel from side thrust.

Around the shaft E, at a convenient point above the frame, are shrunk two bands or collars I, leaving a space between them which is clasped by a box or cap J upon the lever K. This lever has one end fulcrumed to a fixed standard L, which extends upwardly from a beam of the plow-frame, and the opposite end has upon it a handle $k$ with a catch which is adapted to engage with the curved rack-bar M. This rack-bar is fixed to and projects upwardly from the frame and as the standard or shank E is vertically slidable through its supporting and bearing boxes, by means of this lever it may be raised or depressed a short distance, thus regulating the depth to which the plows are allowed to cut. Upon the top of the standard is fixed another lever N, which extends rearwardly and has a catch adapted to engage with a horizontal segment O, by which it is held in any desired position when turned from one side to the other.

The standard or shank E' of the wheel D' is similarly movable up and down by means of a lever K', engaging with a rack M', and it is turned from side to side by means of a lever-arm N', engaging a horizontal rack O', the wheel being similarly constructed to prevent side slip.

When these large gang-plows are being operated, they sometimes become partially unmanageable on account of their large size and peculiar shape, and especially on side hills they are liable to either take too little land or they may be crowded outward and take too much land. When this occurs, by turning either or both of the levers N or N' the wheels D or D' become factors in the correction of this difficulty, and by being thus turned to an angle with the direct course of the plow they tend to either carry it out if it is taking too much land or to force it in if it is taking too little land, and this adjustment is easily made at any time, whereas as ordinarily constructed it is necessary to stop and drag the plows to their proper position. The depth of the cut is also easily regulated to suit the conditions by raising or lowering the standards or shanks E of the wheels D.

When it is desired to turn the plow around at the end of the furrow, it can be turned in a very short circle by turning the wheel D at an angle in the direction to which it is desired to turn and turning the wheel D' in the opposite direction, so that while one travels in one direction the other travels in the opposite direction, and the wheel C, being a swivel-wheel, will simply follow round the outside of the curve which is being taken by the plow and allow it to easily turn in a small circle.

Having thus described my invention, what I claim as new, and desire to secure by Letters Patent, is—

1. In a gang-plow having a triangular supporting-frame with one of the bases thereof serving as the front of the plow, the wheels approximately at the angles of said frame, said wheels journaled in forks having vertically-extending shanks or standards, bearings in which the shanks or standards are both slidable and turnable, spaced collars on the shanks or standards and forming annular channels, levers secured between said collars at points intermediate of their ends, vertically-disposed standards to which the outer ends of the levers are adjustably connected whereby the shanks or standards are vertically moved, other levers engaging the shanks or standards and movable in lateral planes to turn the former in their bearings and thereby adjusting the angle of the wheels, and means for securing the free ends of said levers.

2. In a gang-plow of the character described, a swivel-wheel at one angle of the front of the triangular frame, adapted to travel upon the land, a second flanged furrow-wheel at the other front angle of the frame and a corresponding flanged furrow-wheel at the rear angle of said frame, forks in which the furrow-wheels are mounted, having upwardly-extending shanks or standards movable vertically and axially in bearings on the frame, levers secured between their ends, to said shanks or standards, vertically-disposed standards to which the outer ends of the levers are adjustably secured whereby the shanks or standards are movable in vertical planes, other levers fixed to the upper ends of the shanks or standards and movable in horizontal planes to turn the shanks or standards axially whereby the wheels are set at an angle with the line of travel of the plow to correct the side thrust in either direction, vertically-disposed rack-bars for the first-named levers and horizontally-disposed rack-bars for the other levers, whereby said levers are secured.

3. In a gang-plow, a frame of triangular shape having one of its bases serving as the front of the plow, a smooth swivel-wheel at one front angle of the frame adapted to run upon the unplowed land and to freely swivel, a wheel at substantially the opposite front angle and another wheel at the rear angle of the said frame, both of which latter wheels having a projecting flange adapted to enter the hard ground in the furrow to steady and hold the wheels from side thrust, means for independently turning the shanks or standards of the furrow-wheels to vary the angle of the latter, and levers pivoted at one end and engaging the shanks or standards to move them in vertical planes.

In witness whereof I have hereunto set my hand.

GEORGE W. DE WITT.

Witnesses:
S. H. NOURSE,
JESSIE C. BRODIE.